United States Patent
Abeysekera et al.

(10) Patent No.: US 12,185,221 B2
(45) Date of Patent: Dec. 31, 2024

(54) WIRELESS COMMUNICATION SYSTEM, BASE STATION CONTROL DEVICE, COMMUNICATION CONTROL METHOD, AND COMMUNICATION CONTROL PROGRAM

(71) Applicant: Nippon Telegraph and Telephone Corporation, Tokyo (JP)

(72) Inventors: Hirantha Abeysekera, Musashino (JP); Toshiro Nakahira, Musashino (JP); Shoko Shinohara, Musashino (JP); Koichi Ishihara, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 333 days.

(21) Appl. No.: 17/796,137

(22) PCT Filed: Jan. 28, 2020

(86) PCT No.: PCT/JP2020/002977
§ 371 (c)(1),
(2) Date: Jul. 28, 2022

(87) PCT Pub. No.: WO2021/152691
PCT Pub. Date: Aug. 5, 2021

(65) Prior Publication Data
US 2023/0142888 A1    May 11, 2023

(51) Int. Cl.
*H04W 48/06* (2009.01)
(52) U.S. Cl.
CPC .................................. *H04W 48/06* (2013.01)
(58) Field of Classification Search
None
See application file for complete search history.

(56) References Cited

U.S. PATENT DOCUMENTS

| | | | |
|---|---|---|---|
| 7,693,530 B1* | 4/2010 | McKinney | H04W 48/02 455/26.1 |
| 9,655,028 B2* | 5/2017 | De Benedittis | H04L 63/108 |

(Continued)

FOREIGN PATENT DOCUMENTS

| JP | 2004221684 | 8/2004 |
|---|---|---|
| JP | 2010541514 | 12/2010 |

OTHER PUBLICATIONS

[No Author Listed], "802.11 High Speed Wireless LAN Text," 802.11 High Speed Wireless LAN Text, 3rd Edition, Mar. 2008, 5 pages (with English Translation).

*Primary Examiner* — Kenneth B Wells
(74) *Attorney, Agent, or Firm* — Fish & Richardson P.C.

(57) ABSTRACT

A wireless communication system includes a plurality of base stations to which one or more terminal stations are connectable, and a base station control device controlling each of the plurality of base stations. The base station control device includes an information collection unit collecting connection information regarding the terminal stations connected to the base stations from each of the base stations, a list generation unit generating a white list indicating the terminal stations allowed to be connected to the base stations for each of the base stations based on the connection information, and a transmission unit configured to transmit the white list to each of the base stations. Each of the base stations includes a reception unit receiving the white list, and a setting unit performing setting so as to allow or inhibit connection of each of the terminal stations to the base station based on the received white list.

6 Claims, 11 Drawing Sheets

(56) References Cited

U.S. PATENT DOCUMENTS

2009/0094680 A1 4/2009 Gupta et al.
2015/0140967 A1* 5/2015 Leu ...................... H04W 48/02
　　　　　　　　　　　　　　　　　　　455/411

* cited by examiner

Fig. 8

|  | BASE STATION 2-1 | BASE STATION 2-2 | BASE STATION 2-3 | BASE STATION 2-4 | BASE STATION 2-5 | ... |
|---|---|---|---|---|---|---|
| TERMINAL STATION 6-1 | −45 | −56 | −48 |  |  |  |
| TERMINAL STATION 6-2 |  | −60 |  |  |  |  |
| TERMINAL STATION 6-3 | −30 | −80 | −55 | −78 |  |  |
| TERMINAL STATION 6-4 | −80 |  |  | −56 | −65 |  |

(dBm)

Fig. 9

|  | BASE STATION 2-1 | BASE STATION 2-2 | BASE STATION 2-3 | BASE STATION 2-4 | BASE STATION 2-5 | ... |
|---|---|---|---|---|---|---|
| TERMINAL STATION 6-1 | ● | ● | ● |  |  |  |
| TERMINAL STATION 6-2 |  | ● |  |  |  |  |
| TERMINAL STATION 6-3 | ● |  | ● |  |  |  |
| TERMINAL STATION 6-4 |  |  |  | ● | ● |  |

Fig. 10

|  | BASE STATION 2-1 | BASE STATION 2-2 | BASE STATION 2-3 | BASE STATION 2-4 | BASE STATION 2-5 | ... |
|---|---|---|---|---|---|---|
| TERMINAL STATION 6-1 | ● | ● | ● | | | |
| TERMINAL STATION 6-2 | | ● (DETERMINE) | | | | |
| TERMINAL STATION 6-3 | ● (DETERMINE) | | ● | | | |
| TERMINAL STATION 6-4 | | | | ● | ● | |
| THE NUMBER OF DETERMINED TERMINAL STATIONS | 1 | 1 | 0 | 0 | 0 | |
| THE NUMBER OF TERMINAL STATIONS WHICH CAN BE ADDITIONALLY CONNECTED | 0 | 0 | 1 | 1 | 1 | |
| THE NUMBER OF TERMINAL STATION CANDIDATES | 2 | 2 | 2 | 1 | 1 | |

WIRELESS COMMUNICATION SYSTEM, BASE STATION CONTROL DEVICE, COMMUNICATION CONTROL METHOD, AND COMMUNICATION CONTROL PROGRAM

CROSS-REFERENCE TO RELATED APPLICATIONS

This application is a National Stage application under 35 U.S.C. § 371 of International Application No. PCT/JP2020/002977, having an International Filing Date of Jan. 28, 2020, the disclosure of which is considered part of the disclosure of this application, and is incorporated by reference in its entirety into this application.

TECHNICAL FIELD

The present invention relates to a wireless communication system, a base station control device, a communication control method, and a communication control program.

BACKGROUND ART

In recent years, a widespread use of high-performance portable wireless terminals such as notebook computers and smartphones has led a wireless local area network (LAN) which complies with IEEE802.11 standards to be widely used at home, in addition to use at companies and in publicly accessible spaces.

The wireless LAN which complies with IEEE802.11 standards includes a wireless LAN complying with IEEE802.11b/g/n standards in which a 2.4 GHz band is used and a wireless LAN complying with IEEE802.11a/n/ac standards in which a 5 GHz band is used.

In the wireless LAN complying with IEEE802.11b standards and IEEE802.11g standards, 13 channels are prepared at intervals of 5 MHz from 2400 MHz to 2483.5 MHz. However, in a case where a plurality of channels are used at the same location, it is possible to use up to three channels or four channels at the same time by using channels so that spectra do not overlap with each other to avoid interference.

In the wireless LAN complying with IEEE802.11a standards, a total of 19 channels including 8 channels and 11 channels which do not overlap with each other are respectively defined between 5170 MHz and 5330 MHz and between 5490 MHz and 5710 MHz in Japan. Note that in IEEE802.11a standards, a band width per channel is fixed at 20 MHz.

Maximum transmission speed of the wireless LAN is 11 Mbps in IEEE802.11b standards and is 54 Mbps in IEEE802.11a standards and IEEE802.11g standards. However, the transmission speed here is transmission speed on a physical layer.

Actually, transmission efficiency in a medium access control (MAC) layer is approximately from 50 to 70%, and thus, an upper limit value of throughput is approximately 5 Mbps in IEEE802.11b standards and is approximately 30 Mbps in IEEE802.11a standards and IEEE802.11g standards. Further, transmission speed further decreases if the number of wireless stations which try to transmit information increases.

Meanwhile, in a wired LAN, as well as a 100 Base-T interface of Ethernet (registered trademark), fiber to the home (FTTH) which uses an optical fiber has been spread also at every home, and high-speed lines on the order of 100 Mbps to 1 Gbps are provided. Thus, further higher transmission speed is desired also in the wireless LAN.

In IEEE802.11n standards for which standardization has been completed in 2009, a channel band width which has been fixed at 20 MHz so far is expanded to up to 40 MHz, and introduction of multiple input multiple output (MIMO) technique is determined. If transmission and reception are performed by applying all functions defined in IEEE802.11n standards, communication speed of up to 600 Mbps can be achieved in a physical layer.

Further, in IEEE802.11ac standards for which standardization has been completed in 2013, it is determined to expand a channel band width to 80 MHz or up to 160 MHz (or 80+80 MHz) and introduce a transmission method of multiuser MIMO (MU-MIMO) in which space division multiple access (SDMA) is applied. If transmission and reception are performed by applying all functions defined in IEEE802.11ac standards, communication speed of up to approximately 6.9 Gbps can be achieved in a physical layer.

Further, in IEEE802.11ax standards which are currently under formulation, orthogonal frequency division multiple access (OFDMA) which enables transmission and reception of frames by dividing channels of 20 MHz, 40 MHz, 80 MHz, 160 MHz and 80+80 MHz described above into finer sub-channels, is expected to be defined. Use of OFDMA enables simultaneous transmission by a plurality of wireless stations in unit of a resource unit by dividing the above-described channels into finer sub-channels. Further, a function of increasing communication opportunities while reducing interference from other peripheral cells by control of a carrier sense threshold (CCA threshold) is expected to be defined in IEEE802.11ax standards.

The wireless LAN complying with IEEE802.11 standards is operated in a frequency band of a 2.4 GHz band or a 5 GHz band for which license is not required. In this event, in a case where a base station complying with IEEE802.11 standards forms a wireless LAN cell (basic service set (BSS)), the base station selects one frequency channel from frequency channels which can be supported at the own station and operates the frequency channel.

A channel to be used at the own cell, setting values of a band width and other parameters, and other parameters which can be supported at the own station are described in a Beacon frame which is periodically transmitted, a Probe response frame for a Probe Request frame received from a wireless terminal, or the like. Further, the base station operates the cell by transmitting a frame on the frequency channel which the base station determines to operate and notifying subordinate wireless terminals and other peripheral wireless stations.

Examples of a method for selecting and setting a frequency channel, a band width and other parameters at the base station can include the following four methods:

(1) a method in which default parameter values set in advance at the base station are used as is,
(2) a method in which values manually set by a user who operates the base station are used,
(3) a method in which parameter values are autonomously selected and set based on wireless environment information detected by each base station upon start-up, and
(4) a method in which parameter values determined by a central control station such as a wireless LAN controller are set.

Further, the number of channels which can be used at the same time at the same location is 3 in a wireless LAN of a 2.4 GHz band, and 2, 4, 9 or 19 in a wireless LAN of a 5 GHz band in accordance with a channel band width to be used for communication. Thus, in a case where a wireless LAN is actually introduced, it is necessary to select a channel to be used by the base station within the own BSS (see, for example, Non-Patent Literature 1 and Non-Patent Literature 2).

While the number of channels which can be used at the same time at the same location in a 5 GHz band is 19 channels in a case where the channel band width is 20 MHz, in a case where the channel band width is expanded to 40 MHz, 80 MHz, 160 MHz or 80+80 MHz, the number of channels which can be used at the same time at the same location in a 5 GHz band decreases to 9 channels, 4 channels, and 2 channels. In other words, the number of channels which can be used decreases as the channel band width increases.

In a wireless LAN dense environment where the number of channels which can be used is larger than the number of BSSs, a plurality of BSSs use the same channel (overlapping BSS (OBSS)). Thus, in the wireless LAN, autonomous distributed access control in which data is transmitted only in a case where a channel is available by carrier sense is used using carrier sense multiple access with collision avoidance (CSMA/CA).

Specifically, a wireless station at which a transmission request occurs first performs carrier sense in a predetermined sensing period (distributed inter-frame space (DIFS)) to monitor a state of a wireless medium, and if there is no transmission signal by other wireless stations in this period, performs random back-off. The wireless station continuously performs carrier sense also during a random back-off period, and in a case where there is no transmission signal by other wireless stations also in this period, obtains right to utilize a channel.

Note that whether there is transmission/reception by other wireless stations is determined by whether or not a signal greater than a carrier sense threshold set in advance is received. The wireless station which obtains the right to utilize the channel can transmit data to other wireless stations within the same BSS and can receive data from these other wireless stations.

In a case where such CSMA/CA control is performed, in a wireless LAN dense environment where the same channel is used, a channel becomes busy more frequently by carrier sense, which lowers throughput. It is therefore important to monitor a surrounding environment, select an appropriate channel and select a transmission power value and a carrier sense threshold which enable simultaneous transmission and reception.

Further, a method for selecting the above-described parameters such as a type of 2.4 GHz or 5 GHz which is an operating frequency band of the base station and a channel to be utilized in the operating frequency band is not defined in IEEE802.11 standards, and thus, respective vendors which supply base stations employ individual methods.

CITATION LIST

Non-Patent Literature

Non-Patent Literature 1: supervised by Masahiro Morikura, Shuji Kubota, "802.11 high-speed wireless LAN textbook", revised third edition, Impress R&D, March, 2008

SUMMARY OF THE INVENTION

Technical Problem

However, respective wireless stations select the above-described parameters in an autonomous distributed manner, which makes it impossible to achieve optimization as the whole system, and particularly, in an environment where there are a number of wireless stations, there is a case where user quality largely degrades.

Further, in recent years, the number of wireless stations at which a plurality of wireless modules are mounted has increased. This is because a band width to be used can be expanded and user throughput within a service area can be increased by mounting a plurality of wireless modules in the same chassis and using different frequency bands and different channels.

Further, in an environment where a plurality of wireless stations or wireless modules are operated, while a terminal station needs to select an appropriate wireless station to be connected and connect to the wireless station, factors such as environmental change may force the terminal station to switch the wireless station to which it is being connected. Due to this switching of the wireless station to be connected, there is a case where unnecessary control signals fly around and quality degrades in association with communication disconnection due to switching of the wireless station.

An object of the present invention is to provide a wireless communication system, a base station control device, a communication control method, and a communication control program, with which degradation of communication quality due to a terminal station switching a connection destination can be prevented and efficient wireless communication can be achieved as the whole system.

Means for Solving the Problem

A wireless communication system according to one aspect of the present invention is a wireless communication system which includes a plurality of base stations to which one or more terminal stations are connectable, and a base station control device which controls each of the base stations, the base station control device including an information collection unit configured to collect connection information regarding the terminal stations connected to the base stations from each of the base stations, a list generation unit configured to generate a white list indicating the terminal stations which are allowed to be connected to the base stations for each of the base stations based on the connection information, and a transmission unit configured to transmit the white list generated by the list generation unit to each of the base stations, and each of the base stations including a reception unit configured to receive the white list transmitted by the transmission unit, and a setting unit configured to perform setting so as to allow or inhibit connection of each of the terminal stations to the base station based on the white list received by the reception unit.

Further, a base station control device according to one aspect of the present invention is a base station control device which controls each of a plurality of base stations to which terminal stations are connectable, the base station control device including an information collection unit configured to collect connection information regarding the terminal stations connected to the base stations from each of the base stations, a list generation unit configured to generate a white list indicating the terminal stations which are allowed to be connected to the base stations for each of the base stations based on the connection information, and a transmission unit configured to transmit the white list generated by the list generation unit to each of the base stations.

Further, a communication control method according to one aspect of the present invention is a communication control method for controlling each of a plurality of base stations to which terminal stations are connectable, the communication control method including an information collection step of collecting connection information regarding the terminal stations connected to the base stations from each of the base stations, a list generation step of generating a white list indicating the terminal stations which are allowed to be connected to the base stations for each of the base stations based on the connection information, and a transmission step of transmitting the generated white list to each of the base stations.

Effects of the Invention

According to the present invention, it is possible to prevent degradation of communication quality due to a terminal station switching a connection destination and achieve efficient wireless communication as the whole system.

BRIEF DESCRIPTION OF DRAWINGS

FIG. 8 illustrates results of the base station control device calculating one RSSI value for each of terminal stations for each of base stations.

FIG. 9 illustrates a list of connection destination candidate APs generated by the base station control device.

FIG. 10 illustrates a state where the base station control device performs processing using the list of connection destination candidate APs.

DESCRIPTION OF EMBODIMENTS

Figure 1:
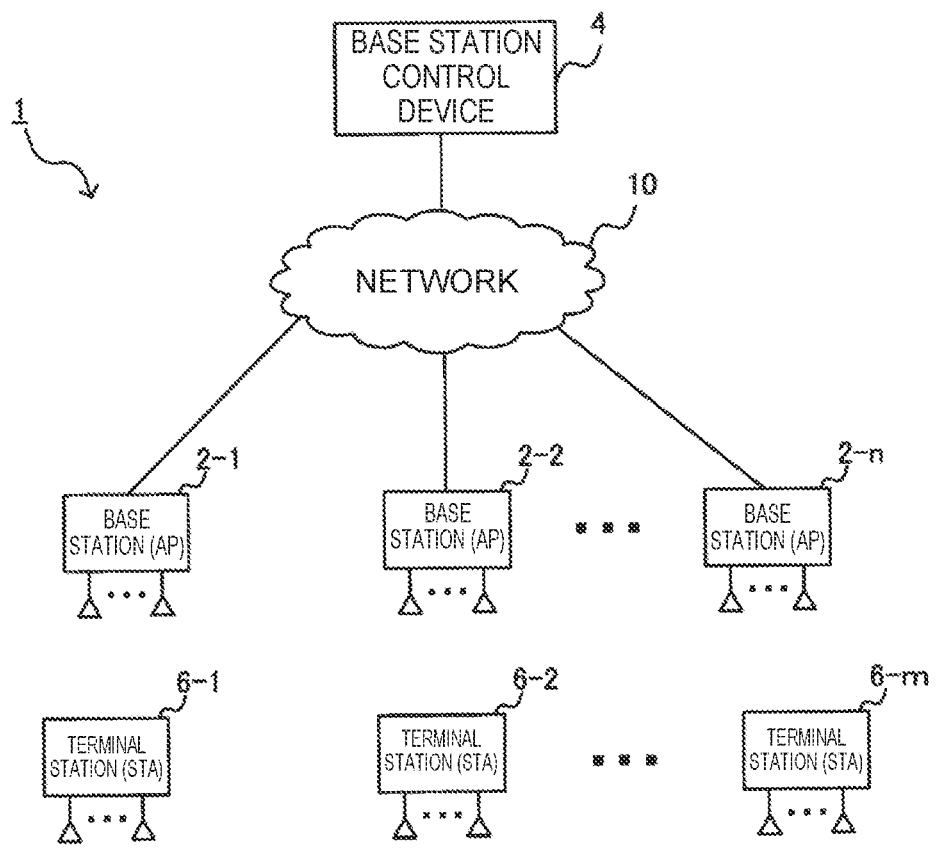
FIG. 1 illustrates a configuration example of a wireless communication system according to one embodiment.

One embodiment of a wireless communication system will be described below using the drawings. FIG. 1 illustrates a configuration example of a wireless communication system 1 according to one embodiment. As illustrated in FIG. 1, the wireless communication system 1 is constituted by, for example, n base stations (APs) 2-1 to 2-n being respectively connected to a base station control device 4 via a network 10.

For example, m terminal stations 6-1 to 6-m are located around the base stations 2-1 to 2-n. Here, the terminal stations 6-1 to 6-m are connectable to at least one of the base stations 2-1 to 2-n.

Note that while an example of a case will be described where the wireless communication system 1 operates while complying with, for example, IEEE802.11ax standards, the system is not limited to this, and the system may operate while complying with other communication standards. Hereinafter, a component which is not specified among a plurality of components as the base stations 2-1 to 2-n will be simply abbreviated as a base station 2, or the like.

Figure 2:
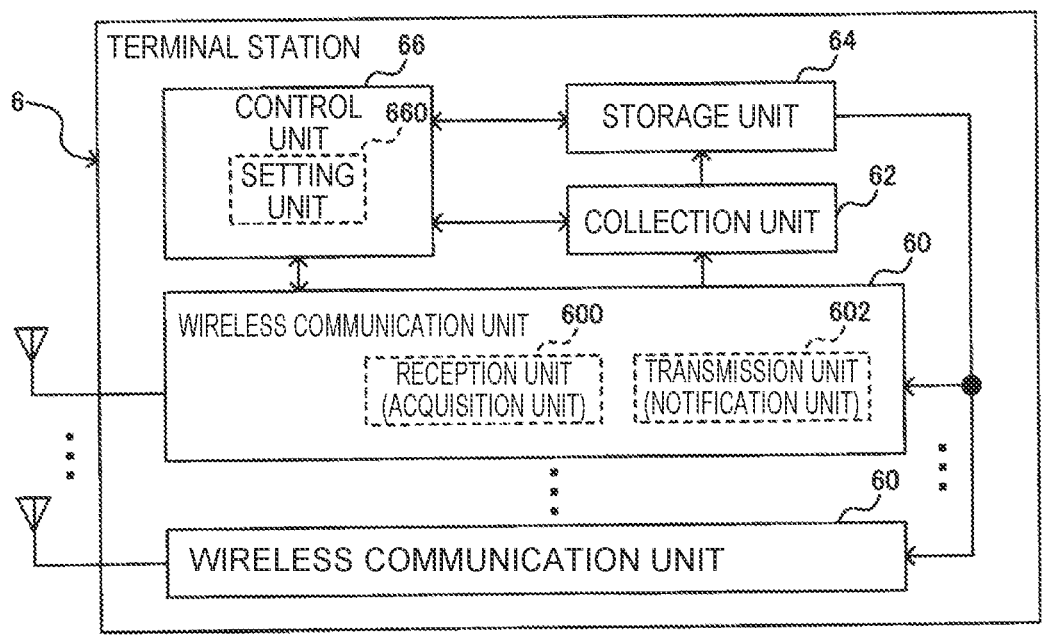
FIG. 2 is a functional block diagram illustrating an example of functions of a terminal station.

The terminal station 6 will be described first. FIG. 2 is a functional block diagram illustrating an example of functions of the terminal station 6. As illustrated in FIG. 2, the terminal station 6 includes, for example, a plurality of wireless communication units 60, a collection unit 62, a storage unit 64, and a control unit 66.

The wireless communication unit 60 includes a reception unit (acquisition unit) 600 and a transmission unit (notification unit) 602 and performs wireless communication with the base station 2 and other terminal stations 6.

The reception unit 600 acquires information by receiving signals transmitted by, for example, the base station 2 and other terminal stations 6 and outputs the information to the collection unit 62. The transmission unit 602 transmits (notifies) information, for example, stored in the storage unit 64 to the base station 2 and other terminal stations 6. Note that the wireless communication units 60 may use different frequency bands or may employ different communication schemes or may perform communication using the same communication scheme.

The collection unit 62 collects wireless environment information, or the like, indicating wireless environments around, for example, the base station 2 and other terminal stations 6 via the wireless communication unit 60 and outputs the wireless environment information, or the like, to the storage unit 64. It is assumed that the wireless environment information includes, for example, connection information regarding connection between the base station 2 and the terminal station 6, such as strength of a received signal strength indicator (RSSI). The storage unit 64 stores the wireless environment information, or the like, collected by the collection unit 62.

The control unit 66 includes a setting unit 660 and controls respective units which constitute the terminal station 6. For example, the setting unit 660 performs setting for operation of the terminal station 6 based on information acquired by the wireless communication unit 60 from the base station 2.

Figure 3:
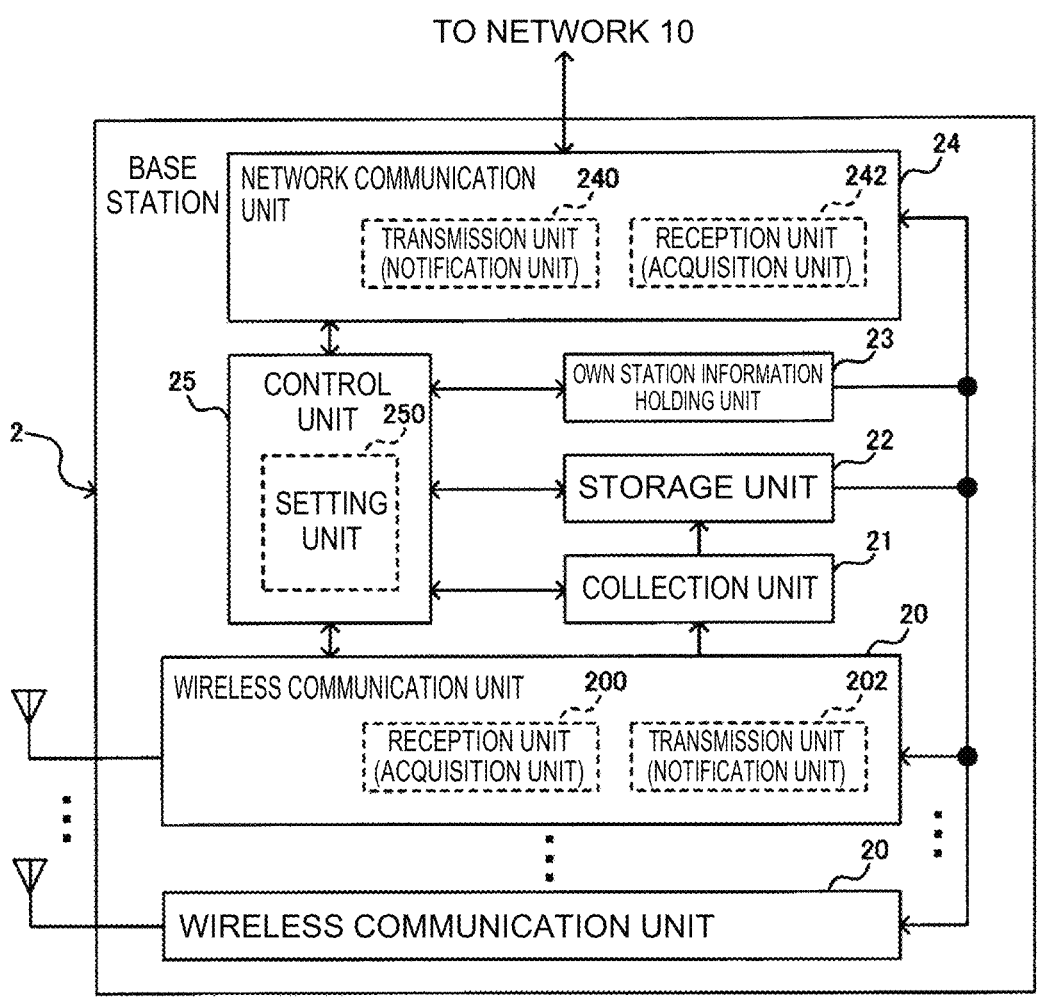
FIG. 3 is a functional block diagram illustrating an example of functions of a base station.

The base station 2 will be described next. FIG. 3 is a functional block diagram illustrating an example of functions of the base station 2. As illustrated in FIG. 3, the base station 2 includes, for example, a plurality of wireless communication units 20, a collection unit 21, a storage unit 22, an own station information holding unit 23, a network communication unit 24, and a control unit 25.

The wireless communication unit 20 includes a reception unit (acquisition unit) 200 and a transmission unit (notification unit) 202 and performs wireless communication with other base stations 2 and the terminal station 6.

The reception unit 200 acquires information by receiving signals transmitted by, for example, other base stations 2 and the terminal station 6 and outputs the information to the collection unit 21. The transmission unit 202 transmits (notifies) signals indicating, for example, information stored in the storage unit 64, own station information (which will be described later) held by the own station information holding unit 23, information acquired by the network communication unit 24 from the base station control device 4, or the like, to other base stations 2 and the terminal station 6. Note that the wireless communication units 20 may use different frequency bands or may employ different communication schemes or may perform communication using the same communication scheme.

The collection unit 21 collects wireless environment information, or the like, including a plurality of information items indicating, for example, wireless environments, or the like around other base stations 2 and the terminal station 6 from other base stations 2 and the terminal station 6 via the wireless communication units 20 and outputs the wireless environment information, or the like, to the storage unit 22. Note that the wireless environment information includes, for example, information regarding communication and connection between the base station 2 and the terminal station 6 and information regarding an operation state of the base station 2. The storage unit 22 stores the wireless environment information, or the like (including connection information), collected by the collection unit 21.

The own station information holding unit 23 holds information regarding the base station 2. For example, the own station information holding unit 23 holds own station information including specifications, functions, and the like, of the own station, such as a frequency band and a communication scheme to be used by the base station 2, the number of connectable terminal stations and the number of wireless communication units 20.

The network communication unit 24 includes a transmission unit (notification unit) 240 and a reception unit (acquisition unit) 242 and performs wired communication or wireless communication with the base station control device 4 via the network 10.

The transmission unit 240 transmits (notifies) signals indicating, for example, the information stored in the storage unit 22 and the own station information held by the own station information holding unit 23 to the base station control device 4. The reception unit 242 acquires information (for example, a white list, a parameter and the like, which will be described later) by receiving signals transmitted by the base station control device 4. Further, the reception unit 242 outputs information which is received from the base station control device 4 and which should be transmitted to the terminal station 6, to the wireless communication unit 20.

The control unit 25 includes a setting unit 250 and controls respective units which constitute the base station 2. For example, the setting unit 250 performs setting for operation of the base station 2 based on the information acquired by the network communication unit 24 from the base station control device 4, the information acquired by the wireless communication unit 20 from the terminal station 6, and the like.

For example, the setting unit 250 performs setting so as to allow or inhibit connection of each of the terminal stations 6 to the base station 2 based on a white list (WL) received by the reception unit 242. Further, the setting unit 250 may perform setting for operation of the terminal station 6.

Figure 4:
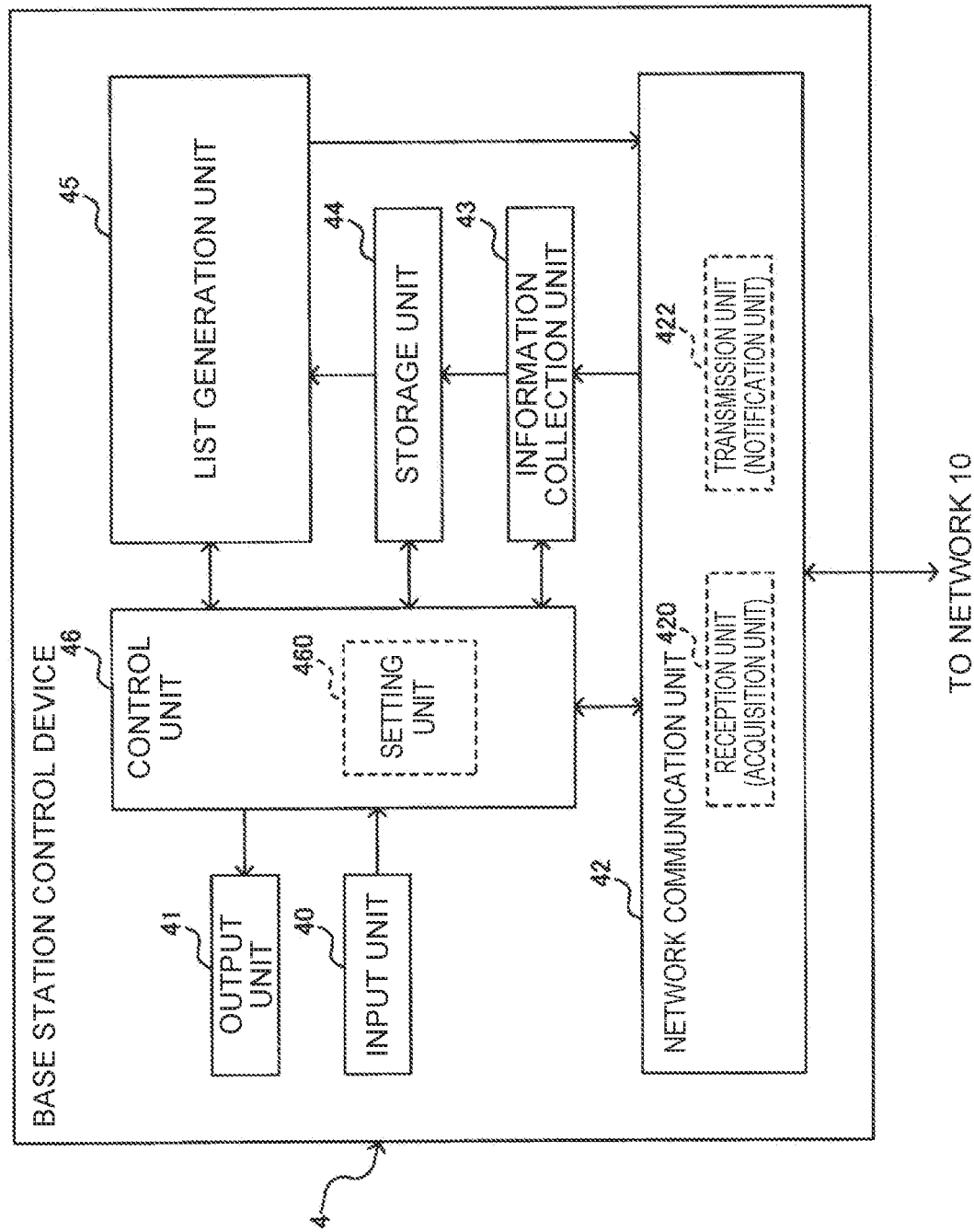
FIG. 4 is a functional block diagram illustrating an example of functions of a base station control device according to one embodiment.

The base station control device 4 will be described next. FIG. 4 is a functional block diagram illustrating an example of functions of the base station control device 4 according to one embodiment. As illustrated in FIG. 4, the base station control device 4 includes, for example, an input unit 40, an output unit 41, a network communication unit 42, an information collection unit 43, a storage unit 44, a list generation unit 45, and a control unit 46.

The input unit 40 accepts input (such as instructions and settings) by a worker with respect to the base station control device 4. The output unit 41 outputs results, or the like, of processing by the base station control device 4 so as to show the results, or the like, to the worker.

The network communication unit 42, which includes a reception unit (acquisition unit) 420 and a transmission unit (notification unit) 422, performs wired communication or wireless communication with the base stations 2-1 to 2-n via the network 10.

The reception unit 420 receives information respectively transmitted by the base stations 2-1 to 2-n and outputs the received information to the information collection unit 43. For example, the reception unit 420 receives wireless environment information, or the like, (including the connection information) respectively collected by the base stations 2-1 to 2-n and outputs the wireless environment information, or the like, to the information collection unit 43. The transmission unit 422 transmits information, or the like, processed by the base station control device 4 to the base stations 2-1 to 2-n. For example, the transmission unit 422 transmits the white list generated by the list generation unit 45 to each of the base stations 2-1 to 2-n.

The information collection unit 43 collects the information received by the reception unit 420 and outputs the information to the storage unit 44. For example, the information collection unit 43 collects wireless environment information (including connection information) such as an operation log including a plurality of information items indicating wireless environments around each base station 2 and each terminal station 6 and a connection state from each of the base stations 2-1 to 2-n and causes the collected results to be stored in the storage unit 44.

The information items included in the wireless environment information include, for example, strength of an RSSI, traffic, the number of terminal stations 6 connected to the base station 2 (the number of connected terminals), channel utilization, a data rate, a channel transition log, or the like.

The list generation unit 45 generates a white list (WL) indicating the terminal stations 6 which are allowed to be connected to the base station 2 for each of the base stations 2 based on, for example, the connection information stored in the storage unit 44. Further, the list generation unit 45 may generate a black list (BL) indicating the terminal stations 6 which are inhibited from being connected to the base station 2 for each of the base stations 2.

For example, the list generation unit 45 determines the base station 2 as a connection destination for the terminal station 6 which has been connected to only one of the base stations 2 and describes the terminal station 6 in the white list.

Further, the list generation unit 45 generates a white list so as to allow connection to one of the base stations 2 for each of the base stations 2 based on a threshold of signal strength determined in advance, the number of terminal stations which are allowed to be connected, a maximum number of connectable terminal stations, or the like, for the terminal station 6 which has been connected to two or more base stations 2.

Further, in a case where there are a plurality of terminal stations 6 which have no reason to be inhibited from being connected to one of the base stations 2, the list generation unit 45 generates a white list so as to set one of the base stations 2 to which the terminal station 6 has been connected last as a connection destination of the terminal station 6.

In this event, the list generation unit 45 may generate a white list so as to specify one or more base stations 2 which become connection destinations for all the terminal stations 6 which are connected to the base stations 2-1 to 2-n.

The control unit 46, which includes the setting unit 460, controls respective units which constitute the base station control device 4. Further, the control unit 46 causes results obtained by respective units which constitutes the base station control device 4 processing information, to be stored in the storage unit 44.

The setting unit 460 performs setting for the respective units which constitute the base station control device 4. For example, the setting unit 460 performs setting for the information collection unit 43 and the list generation unit 45 based on settings input by the worker via the input unit 40.

Figure 5:
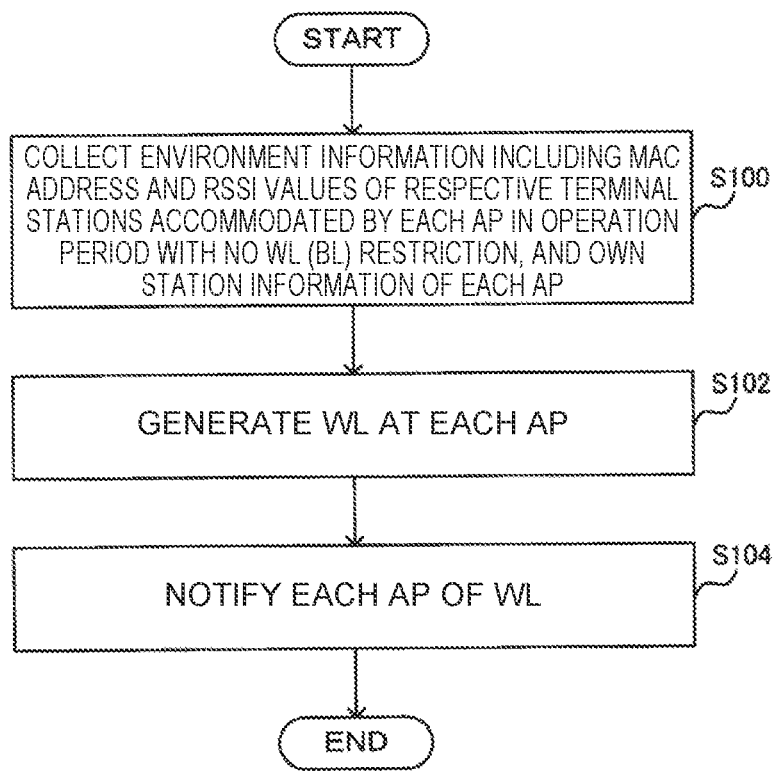
FIG. 5 is a flowchart illustrating an operation example of the base station control device according to one embodiment.

An operation example of the wireless communication system 1 will be described next. FIG. 5 is a flowchart illustrating an operation example of the base station control device 4. As illustrated in FIG. 5, the base station control device 4 collects wireless environment information including, for example, MAC addresses and RSSI values of the respective terminal stations 6 accommodated in the respective base stations (APs) 2 and own station information of the respective base stations 2 in an operation period during which connection is not restricted based on the white list (WL) or the black list (BL) (S100).

Further, the base station control device 4 generates a white list of each base station 2 (S102) and notifies each base station 2 of the white list (S104).

Figure 6:
FIG. 6 illustrates an example of periodic operation to be performed by the wireless communication system according to one embodiment.

FIG. 6 illustrates an example of periodic operation to be performed by the wireless communication system 1. As illustrated in FIG. 6, the wireless communication system 1 periodically repeats an operation period A (information collection period) during which connection is not restricted based on the white list (or the black list) and an operation period B (connection restricted period: switching prevention period) during which connection is restricted based on the white list (or the black list).

In the operation period A, the base station control device 4 executes operation illustrated in FIG. 5 to cause each of the base stations 2 to prepare for the operation period B. Each of the base stations 2 does not restrict switching of a connection destination of the terminal station 6. In other words, the terminal station 6 itself determines the base station 2 which becomes a connection destination and connects to the base station 2.

In this event, there is a possibility that the base station 2 which becomes a connection destination of the terminal station 6 may change in accordance with change, or the like, of a wireless environment. Further, there is also a possibility that a plurality of base stations 2 can accommodate one terminal station 6.

In the operation period B, each of the base stations 2 restricts connection for each of the terminal stations 6 on the basis of the white list. Specifically, each base station 2 accommodates only the terminal stations 6 which are allowed in the white list notified from the base station control device 4 and inhibits connection from terminal stations other than the terminal stations 6 which are allowed in the white list.

Figure 7:
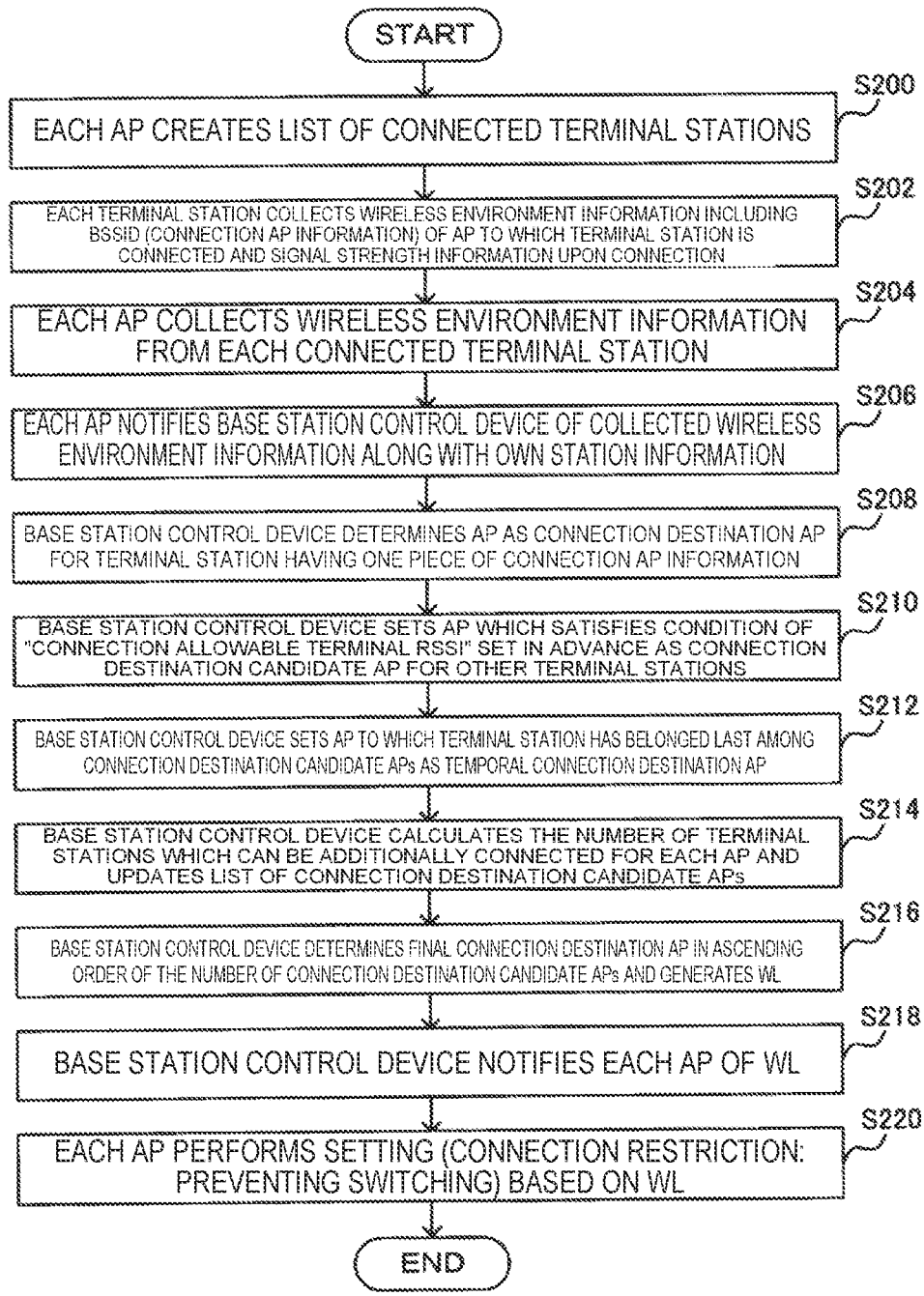
FIG. 7 is a flowchart illustrating a more detailed operation example of the wireless communication system according to one embodiment.

A more detailed operation example of the wireless communication system 1 will be described next. FIG. 7 is a flowchart illustrating a more detailed operation example of the wireless communication system 1.

As illustrated in FIG. 7, first, each base station 2 to be controlled by the base station control device 4 creates a list of terminal stations 6 connected within an information collection period (S200).

Each terminal station 6 collects wireless environment information including basic service set identifiers (BSSIDs) of the base stations 2 connected within the information collection period and signal strength information upon connection (S202). The BSSID of the base station 2 is set as connection AP information.

Each base station 2 collects the wireless environment information from each connected terminal station 6 (S204) and notifies the base station control device 4 of the collected wireless environment information along with own station information (S206).

The base station control device 4 determines the base station 2 as a connection destination AP for the terminal station 6 including one piece of connection AP information (S208).

The base station control device 4 sets the base station 2 which satisfies a condition of a "connection allowable terminal RSSI" set in advance as a connection destination candidate AP for other terminal stations 6 (S210). The condition of the connection allowable terminal RSSI is, for example, a condition that a value of an RSSI is equal to or greater than a predetermined threshold.

The base station control device 4 sets the base station 2 to which the terminal station 6 has belonged last among the connection destination candidate APs as a temporal connection destination AP of the terminal station 6 (S212).

The base station control device 4 calculates the number of terminal stations 6 which can be additionally connected for each of the base stations 2 and updates the list of the connection destination candidate APs (S214).

The base station control device 4 determines the final connection destination AP for the terminal stations 6 in ascending order of the number of connection destination candidate APs of the terminal stations 6 and generates the WL (S216).

The base station control device 4 notifies each base station 2 of the white list (S218).

Then, each base station 2 performs setting (connection restriction: switching prevention) based on the white list (S220).

Details of operation of the base station control device 4 creating a white list will be described next using a specific example.

The base station control device 4 generates a white list for each of the base stations 2 by performing the following processing from <1> to <5>. Here, description will be provided using an example of a case where four terminal stations 6-1 to 6-4 are located in an area where the base stations 2-1 to 2-5, or the like, are provided.

<1> The base station control device 4 creates a list of the connection destination candidate APs for each of the terminal stations 6 by performing the following processing indicated from (A) to (C).

(A) Each of the terminal stations 6 collects BSSIDs (connection AP information) of all the base stations 2 connected within the information collection period and RSSI values upon connection. The base station control device 4 collects the connection AP information of the terminal stations 6 which belong to each of the base stations 2-1 to 2-5 and RSSI values within a past predetermined period ($T_{WL\_RSSI\_AVG}$) during which the terminal stations 6 are connected, from each of the base stations 2-1 to 2-5. $T_{WL\_RSSI\_AVG}$ is set at a period such as five minutes and ten minutes.

(B) The base station control device 4 calculates one RSSI value for each of the terminal stations 6, for each of the base stations 2. For example, the base station control device 4 selects the latest x (x=0, 1, 2, . . . ) RSSI values from RSSI values acquired within $T_{WL\_RSSI\_AVG}$ and calculates an average value of x RSSI values. In a case where an average value of all the RSSI values within $T_{WL\_RSSI\_AVG}$ is calculated, x is set as x=0.

FIG. 8 illustrates results of the base station control device 4 calculating one RSSI value for each of the terminal stations 6, for each of the base stations 2.

(C) In a case where the above-described condition (threshold) of the connection allowable terminal RSSI is set at −70 dBm, the base station control device 4 generates a list (FIG. 9) of connection destination candidate APs for each of the terminal stations 6 using the results illustrated in FIG. 8 and the condition of the connection allowable terminal RSSI.

FIG. 9 illustrates the list of the connection destination candidate APs generated by the base station control device 4. The base station control device 4 generates a white list for each of the base stations 2 by performing the following processing from <2> to <5> using the list of the connection destination candidate APs illustrated in FIG. 9.

FIG. 10 illustrates a state (part of process) where the base station control device 4 performs processing from <2> to <5> using the list of the connection destination candidate APs illustrated in FIG. 9.

<2> For the terminal station 6 having only one connection destination candidate AP, the base station control device 4 determines the AP as the connection destination AP. In the example illustrated in FIG. 10, the connection destination candidate AP for the terminal station 6-2 is only the base station 2-2, and thus, the base station control device 4 determines the base station 2-2 as the connection destination AP of the terminal station 6-1.

<3> The base station control device 4 determines whether or not the base station 2 to which the terminal station 6 for which a connection destination has not been determined yet has belonged last within $T_{WL\_RSSI\_AVG}$ is included in the connection destination candidate APs. In a case where the base station 2 to which the terminal station 6 has belonged last within $T_{WL\_RSSI\_AVG}$ is included in the connection destination candidate APs, the base station control device 4 sets the base station 2 as the connection destination AP. This is because it eliminates the need of switching of the connection destination and stabilize wireless communication.

For example, in a case where information collected for the terminal station 6-3 is as follows, as illustrated in FIG. 10, the base station 2-1 is set as the connection destination AP of the terminal station 6-3.

In a case where the terminal station 6-3 belongs to the base station 2-3 at collection time=11:30
  (the base station 2-3 is included in the connection destination candidate APs)
In a case where the terminal station 6-3 belongs to the base station 2-2 at collection time=11:32
  (the base station 2-2 is not included in the connection destination candidate APs)
In a case where the terminal station 6-3 belongs to the base station 2-1 at collection time=11:35
  (the base station 2-1 is included in the connection destination candidate APs)

<4> The base station control device 4 calculates the remaining number of terminal stations which can be accommodated in each of the base stations 2 (the number of terminal stations which can be additionally connected) based on the number of connectable terminal stations included in the own station information of each of the base stations 2. The base station control device 4 then updates the list of the connection destination candidate APs for the terminal station 6 for which a connection destination has not been determined yet based on the number of terminal stations which can be additionally connected to each of the base stations 2.

Here, the number of terminal stations which can be connected to each of the base stations 2 is set at "one", and the number of terminal stations which can be additionally connected to the base station 2 to which one terminal station 6 is connected is set at "0".

<5> In this event, the terminal stations 6 to be connected to the base stations 2-3 to 2-5 are not determined. The base station control device 4 determines the connection destination AP for the terminal stations 6 for which connection destinations have not been determined yet in ascending order of the number of connection destination candidate APs of the terminal stations 6. Here, in a case where there are a plurality of connection destination candidate APs, the base station control device 4 selects a connection destination AP which allows connection of the smallest number of terminal stations 6 in the white list.

For example, in the example illustrated in FIG. 10, only the base station 2-3 is left as the connection destination candidate AP of the terminal station 6-1. Meanwhile, the base stations 2-4 and 2-5 are left as the connection destination candidate APs of the terminal station 6-4. Thus, the base station control device 4 first determines the base station 2-3 as the connection destination AP of the terminal station 6-1, and then, determines one of the base stations 2-4 and 2-5 as the connection destination AP of the base station 6-4.

In this manner, the wireless communication system 1 generates a white list indicating terminal stations 6 which are allowed to be connected to the base station 2 for each of the base stations 2 based on the connection information, so that it is possible to prevent degradation of communication quality due to the terminal station 6 switching a connection destination and achieve efficient wireless communication as the whole system.

Note that part or all of respective functions of the base station 2, the base station control device 4 and the terminal station 6 may be implemented with hardware such as a programmable logic device (PLD) and a field programmable gate array (FPGA) or may be implemented as a program to be executed by a processor such as a CPU.

For example, the base station control device 4 according to the present invention can be implemented using a computer and a program, and the program can be recorded in a storage medium or can be provided through a network.

Figure 11:
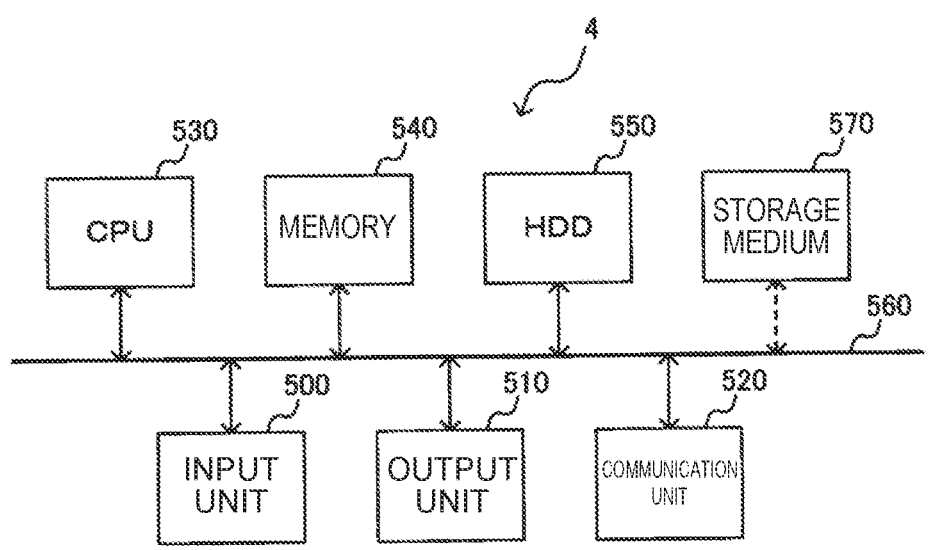
FIG. 11 illustrates a hardware configuration example of the base station control device according to one embodiment.

FIG. 11 illustrates a hardware configuration example of the base station control device 4 (the base station 2, the terminal station 6) according to one embodiment. As illustrated in FIG. 11, for example, the base station control device 4, to which an input unit 500, an output unit 510, a communication unit 520, a CPU 530, a memory 540 and an HDD 550 are connected via a bus 560, has functions as a computer. Further, the base station control device 4 can input/output data to/from a computer-readable storage medium 570.

The input unit 500 is, for example, a keyboard, a mouse, or the like. The output unit 510 is, for example, a display device such as a display. The communication unit 520, which is, for example, a wired or wireless network interface, can perform a plurality of wireless communications.

The CPU 530 controls respective units which constitute the base station control device 4 and performs calculation, or the like, described above. The memory 540 and the HDD 550 constitute the storage unit 44 described above which stores data. Particularly, the memory 540 stores respective pieces of data to be used for calculation described above. The storage medium 570 can store a wireless communication program, or the like, for executing functions of the base station control device 4. Note that architecture constituting the base station control device 4 (the base station 2, the terminal station 6) is not limited to the example illustrated in FIG. 11.

In other words, it is assumed that the "computer" described here includes hardware such as an OS and peripheral equipment. Further, the "computer-readable storage medium" indicates a storage device such as a portable medium such as a flexible disk, a magnetooptical disk, a ROM and a CD-ROM.

Further, the "computer-readable storage medium" may include a medium which dynamically holds a program in a short period, such as a communication line in a case where a program is transmitted via a network such as the Internet or a communication line such as a telephone line, and a medium which holds a program in a certain period, such as a volatile memory inside a computer which becomes a server or a client in that case.

While the embodiment of the present invention has been described above with reference to the drawings, the above-described embodiment is merely an example of the present invention, and it is obvious that the present invention is not limited to the above-described embodiment. Thus, components may be added, omitted, replaced, or changed within a range not deviating from the technical idea and the scope of the present invention.

REFERENCE SIGNS LIST

1 Wireless communication system
2-1 to 2-*n* Base station
4 Base station control device
6-1 to 6-*m* Terminal station
20 Wireless communication unit
21 Collection unit
22 Storage unit
23 Own station information holding unit
24 Network communication unit
25 Control unit
40 Input unit
41 Output unit
42 Network communication unit
43 Information collection unit
44 Storage unit
45 List generation unit
46 Control unit
60 Wireless communication unit
62 Collection unit
64 Storage unit
66 Control unit
200, 242, 420, 600 Reception unit (acquisition unit)
202, 240, 422, 602 Transmission unit (notification unit)
250, 460, 660 Setting unit
500 Input unit
510 Output unit
520 Communication unit
530 CPU
540 Memory
550 HDD
560 Bus
570 Storage medium

The invention claimed is:

1. A wireless communication system comprising:
a plurality of base stations to which one or more terminal stations are connectable; and
a base station control device, implemented using one or more computing devices, configured to control each of the plurality of base stations,
wherein the base station control device comprises:
an information collection unit, implemented using one or more computing devices, configured to collect, from each of the plurality of base stations, connection information regarding one or more terminal stations connected to the plurality of base stations among the one or more connectable terminal stations,
a list generation unit, implemented using one or more computing devices, configured to generate a list indicating one or more terminal stations, among the one or more connected terminal stations, allowed to be connected to each of the plurality of base stations based on the connection information, and
a transmitter configured to transmit the list generated by the list generation unit to each of the plurality of base stations,
wherein each of the plurality of base stations comprises:
a receiver configured to receive the list transmitted by the transmitter, and
a setting unit, implemented using one or more computing devices, configured to perform setting so as to allow or block connection of each of the one or more terminal stations to each of the plurality of base stations based on the list received by the receiver, and
wherein the list generation unit is configured to generate the list for each of the plurality of base stations so that, (i) for a terminal station connected to only a first base station among the plurality of base stations, the first base station is determined as a connection destination and, (ii) for a terminal station connected to two or more base stations among the plurality of base stations, connection to one of the two or more base stations among the plurality of base stations is allowed based on a threshold of signal strength determined in advance, a number of terminal stations allowed to be connected, and a maximum number of connectable terminal stations.

2. The wireless communication system according to claim 1,
wherein the list generation unit is configured to generate the list so as to, based on a plurality of terminal stations being available to connect to one of the plurality of base stations, set one of the plurality of base stations to which a terminal station has been connected last as a connection destination of the terminal station.

3. A base station control device configured to control each of a plurality of base stations to which terminal stations are connectable, the base station control device comprising:
an information collection unit, implemented using one or more computing devices, configured to collect, from each of the base stations, connection information regarding one or more terminal stations connected to the plurality of base stations among the one or more connectable terminal stations;
a list generation unit, implemented using one or more computing devices, configured to generate a list indicating one or more terminal stations, among the one or more connected terminal stations, allowed to be connected to each of the plurality of base stations based on the connection information; and
a transmitter configured to transmit the list generated by the list generation unit to each of the plurality of base stations,
wherein the list generation unit is configured to generate the list for each of the plurality of base stations so that, (i) for a terminal station connected to only a first base station among the plurality of base stations, the first base station is determined as a connection destination and, (ii) for a terminal station connected to two or more base stations among the plurality of base stations, connection to one of the two or more base stations among the plurality of base stations is allowed based on a threshold of signal strength determined in advance, a number of terminal stations allowed to be connected, and a maximum number of connectable terminal stations.

4. The base station control device according to claim 3, wherein the list generation unit is configured to generate the list so as to, based on a plurality of terminal stations being available to connect to one of the plurality of base stations, set one of the plurality of base stations to which a terminal station has been connected last as a connection destination of the terminal station.

5. A communication control method for controlling each of a plurality of base stations to which one or more terminal stations are connectable, the communication control method comprising:

collecting, from each of the plurality of base stations, connection information regarding one or more terminal stations connected to the plurality of base stations among the one or more connectable terminal stations;

generating a list indicating one or more terminal stations, among the one or more connected terminal stations, allowed to be connected to each of the plurality of base stations based on the connection information; and transmitting the generated list to each of the plurality of base stations, wherein generating the list comprises generating the list for each of the plurality of base stations so that, (i) for a terminal station connected to only a first base station among the plurality of base stations, the first base station is determined as a connection destination and, (ii) for a terminal station connected to two or more base stations among the plurality of base stations, connection to one of the two or more base stations among the plurality of base stations is allowed based on a threshold of signal strength determined in advance, a number of terminal stations allowed to be connected, and a maximum number of connectable terminal stations.

6. The communication control method according to claim 5, wherein generating the list comprises generating the list so as to, based on a plurality of terminal stations being available to connect to one of the plurality of base stations, set one of the plurality of base stations to which a terminal station has been connected last as a connection destination of the terminal station.

\* \* \* \* \*